United States Patent [19]

Jones

[11] 4,237,262

[45] Dec. 2, 1980

[54] CURABLE ALIPHATIC EPOXY-POLIMIDE COMPOSITIONS

[75] Inventor: Robert J. Jones, Hermosa Beach, Calif.

[73] Assignee: TRW Inc., Redondo Beach, Calif.

[21] Appl. No.: 12,098

[22] Filed: Feb. 14, 1979

[51] Int. Cl.³ .................... C08G 73/10; C08G 59/40
[52] U.S. Cl. ................................. 528/322; 428/413; 525/422; 525/526; 528/533; 528/321
[58] Field of Search ............... 528/322, 117, 120, 321; 525/422

[56] References Cited

U.S. PATENT DOCUMENTS

| | | | |
|---|---|---|---|
| 3,637,901 | 1/1972 | Bargain et al. | 528/322 |
| 3,763,087 | 10/1973 | Holub et al. | 260/837 R |
| 3,839,493 | 10/1974 | Balme et al. | 260/830 P |
| 3,875,113 | 4/1975 | Lefebvre et al. | 528/117 |
| 3,978,152 | 8/1976 | Gruffaz et al. | 260/830 P |
| 4,116,937 | 9/1976 | Jones et al. | 528/322 |

*Primary Examiner*—Harold D. Anderson
*Attorney, Agent, or Firm*—Donald R. Nyhagen; John J. Connors

[57] ABSTRACT

A prepolymer is comprised of the reaction product of at least one aliphatic bismaleimide, at least one aromatic amine and at least one aromatic bismaleimide in combination with an aliphatic epoxy resin providing at least two functional epoxy groups to provide a low temperature curable composition. The cured products are flexible and strongly adherent to a variety of substrates.

21 Claims, No Drawings

CURABLE ALIPHATIC EPOXY-POLIMIDE COMPOSITIONS

The Government has rights in this invention pursuant to Contract (or Grant) No. 33615-77-C-5134, awarded by the Department of the Air Force.

BACKGROUND OF THE INVENTION

Polyimides have exhibited good thermo-oxidative stability in temperature ranges up to 300° to 400° C. Thus, in applications where elevated temperatures and corrosive conditions exist, polyimides have been suggested for extensive application. Early polyimides exhibited a low percentage of elongation to break and utility was limited.

U.S. Pat. No. 3,812,082 teaches a compliant or highly flexible polyimide produced from a condensation reaction of a dianhydride and a diamine or diisocyanate. These polyimides exhibit an elongation to break of up to 300 percent, and a set at break of 25 percent or less. Thus, where a high performance sealing material is required and it can be cast, such polyimides are very suitable.

A significant advance in a practical route to flexible polyimides is taught in U.S. Pat. No. 3,951,902. In this addition-type poly(Diels-Alder) approach, a melt polymerization reaction yields polymers acceptable for use at temperatures up to 288° C. The polyimides processed by this melt process possess properties equivalent to the solution route employed in U.S. Pat. No. 3,812,082. Thus, a melt process is available to provide flexible polyimides which possess a high elongation to break and can be melt extruded or cast into a variety of products including seals, sealants, adhesives and coatings. The availability of melt and hot melt product fabrication processes means substantial cost reduction and significant lessening of human hazards and environmental pollution over polyimides produced and processed by conventional solution methods.

U.S. Pat. No. 3,652,511 teaches a water-dispersible polyimide coating formed by reacting maleic anhydride with an aliphatic diamine in solution. The polyimide product can be formed into a hard and solvent resistant film. Elastomeric or high recoverable elongation characteristics are not inherent to the solution-produced polyimide itself and are achieved only by a copolymer reaction such as reacting a sulfhydryl-terminated polymer, such as nitrile rubber, with the maleic unsaturation in the bismaleimide or the acidic side chain. This approach significantly limits or excludes their utility in terms of applications where use in seal, sealant adhesive and coating use is required at temperatures of 120° C. or greater. Also, such resins have pendant carboxyl groups which result in water solubility. This diminishes their utility for general engineering applications due to possible unfavorable side reactions in high temperature use environments.

Similarly, U.S. Pat. No. 2,818,405 teaches elastomeric polyimides formed by the equal molar reaction of bis-maleimides and free organic diamines. The organic diamines employed in this invention are hydrocarbon or halogenated hydrocarbon segments which restrict temperature performance to 93° C. or below. Also, the technology disclosed necessitates the use of organic tri- or tetraamines to accomplish cure of the linear imide resin initially produced. Use of the technology described therein severely limits achievement of a broad range of polymer mechanical properties because of the requirements to use 1:1 molar reactant stoichiometry.

In U.S. Pat. No. 4,116,937 assigned to the same assignee of this invention and incorporated herein by reference there is described precursors produced by the Michael addition reaction of an aromatic diamine with an aromatic maleimide and a maleimide terminated polyaliphatic ether by a melt process and a cross-linked final product produced by a cure reaction. The addition reaction which forms the maleimide terminated precursor occurs in the melt at temperatures ranging from 100° to 150° C. Subsequently, when the temperature is raised to between 160° C. and 200° C., the precursor cures by a crosslinking reaction requiring no additional additives or catalysts.

There is a need in the art for polyimide sealants which can be readily cured at low temperatures such as from room temperature to about 120° F. This cure should be effected by the use of readily available ingredients and should produce a sealant with improved properties over conventional polysulfide sealants.

It has been determined that an aliphatic bismaleimide alone or modified with an aromatic bismaleimide and/or an aromatic diamine can be made to cure in the presence of a crosslinking agent having at least two vinyl groups and an active free radical catalyst at a temperature of 65° C. or less. A trismaleimide and an acid catalyst can be used in place of the crosslinking agent and free radical catalyst. Careful control, however, is required over proportions of reactants to achieve a product of acceptable properties.

Since the ingredients which form a curable system are often formulated just before application to a substrate and often by unskilled workers, it would be desirable to have a low temperature curable system which is less sensitive to deviations in proportions of ingredients. It is also desirable to provide a system where equal parts by weight or volume can be combined to achieve cure such that non-quantitative judgements can be made in metering reactants with assurance that a useful product will be formed when cure is perfected.

SUMMARY OF THE INVENTION

According to the present invention, there are provided low temperature curable compositions comprising at least one curable polyimide prepolymer formed by heating to a temperature sufficient to cause a thermal reaction between components of a mixture of at least one aliphatic bismaleimide of the formula:

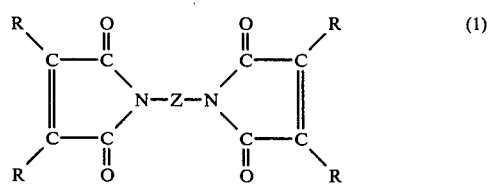

wherein Z is a polyaliphatic ether, preferably a polyaliphatic ether in which the aliphatic groups independently contain from 1 to about 6 carbon atoms and preferably having a molecular weight in the range of about 300 to about 10,000, and each R is independently hydrogen, an aliphatic group containing 1 or 2 carbon atoms, a benzenoid radical, or a halogen; with at least one aromatic polyamine and at least one aromatic bismaleimide of the formula:

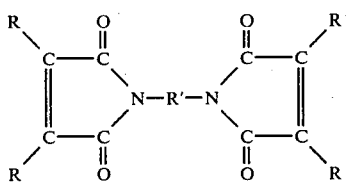

(2)

wherein each R is independently selected from the group consisting of hydrogen, an aliphatic group containing 1 or 2 carbon atoms, a benzenoid radical, and a halogen and wherein R' is a bifunctional benzenoid radical selected from the group consisting of:

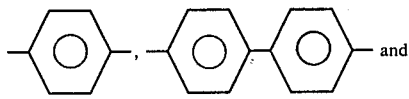 and

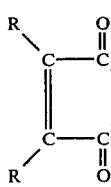

wherein X is selected from the group consisting of —O—, —S—, —SO$_2$—, —CH$_2$—, C$_2$H$_4$—, —CO—, —C$_3$H$_6$—, and

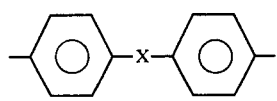;

and at least one aliphatic epoxy resin having the general formula:

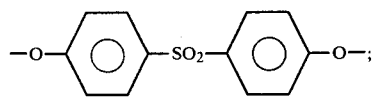 (3)

wherein X' is —O—, —S—, —CH$_2$—, or —CH$_2$CH$_2$—, wherein each R" is independently —H, or —CH$_3$, and wherein n is from 0 to about 20, preferably from about 4 to about 8 and more preferably from about 6 to about 8.

As indicated, one or more of the above-identified polyimides and one or more of the above-identified epoxy resins may be used in formulating a curable composition. Aromatic and cycloaliphatic epoxy resins may be combined with the aliphatic epoxy resins to modify flexibility. The ingredients can be cured over a wide range of formulations. The preferred range is from about 40 to about 95% by weight polyimide prepolymer based on the total weight of polyimide prepolymer(s) and epoxy resin(s) present, more preferably from about 70 to about 90 percent by weight of the polyimide prepolymers based on the total weight of polyimide prepolymer(s) and epoxy resin(s) present.

The polyimide prepolymers provided when combined with the epoxy resins will cure at temperatures from ambient to about 120° F. or more to flexible end products displaying strong adhesion to substrates. Cure may be accomplished with or without an accelerator.

The cured flexible resins offer improved sealing properties over conventional polysulfide sealants and they are suitable for sealant, adhesion and coating applications requiring high adhesion to various surfaces such as metallic and polymer coated surfaces. They offer excellent resistance to hydrocarbon, aromatic, cycloaliphatic and halogenated fuels, hydraulic fluids, and solvents. The compositions are attractive for field repair of aircraft and missiles.

The preferred aliphatic bismaleimides are those having the formula:

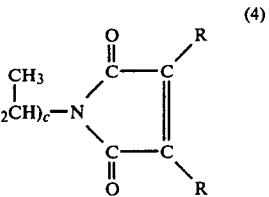

(4)

wherein the sum of a and c is about 3.5 and b is from 13.5 to about 45.5, preferably 20.5, and R is as defined above.

The aromatic polyamines presently comtemplated for reaction with the aliphatic and aromatic bismaleimides to form the prepolymer are compounds of the general formula:

$$NH_2—R'—NH_2 \quad (5)$$

wherein R' is as defined above and aromatic polyamines having the general formula:

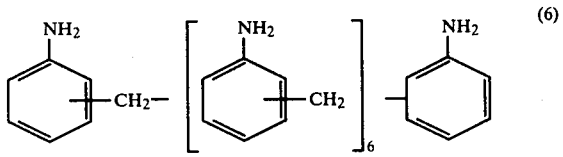 (6)

wherein d is an average value ranging from about 0.1 to about 5, preferably about 0.4. The presently preferred amines are methylene dianiline and the amine of formula (6) where d is about 0.4.

The presently preferred aromatic bismaleimide is bis (4-maleimidophenyl) methane which has the formula:

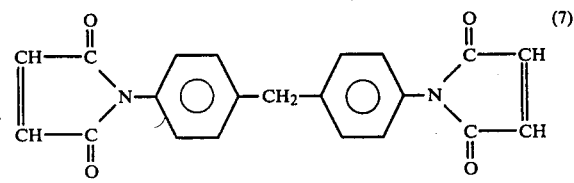 (7)

DETAILED DESCRIPTION

The invention is directed to low temperature curable compositions in which the essential ingredients are (a) at least one curable polyimide prepolymer formed by heating to a temperature sufficient to cause a thermal reaction between components of a mixture of an aliphatic bismaleimide, an aromatic polyamine, an aromatic bismaleimide and (b) at least one aliphatic epoxy resin containing at least two functional epoxy groups.

The compositions cure, with or without an accelerator at temperatures ranging from ambient to 120° F. or more to flexible end products. Cure is by reaction of epoxy groups with the hydrogen of a functional nitrogen atom. Aromatic and/or cycloaliphatic epoxy resins may be combined with the aliphatic epoxy resin to modify flexibility. The cured polymer compositions are particularly suitable for sealant, adhesive, and coating applications requiring high adhesion to various surfaces such as to metallic and polymer coated surfaces. The cured polymer compositions offer excellent resistance to aromatic, cycloaliphatic and halogenated hydrocarbon fuels, hydraulic fluids and solvents. The compositions are particularly attractive for field repair of aircraft and missiles.

The prepolymer has as an essential ingredient at least one aliphatic bismaleimide having the formula:

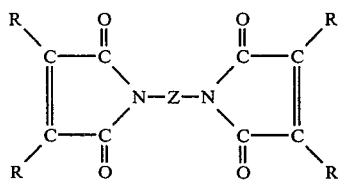
(1)

wherein Z represents a polyaliphatic ether, preferably a polyaliphatic ether in which the aliphatic groups independently contain from one to about six carbon atoms and wherein each R is independently hydrogen, an aliphatic group containing one or two carbon atoms, a benzenoid radical, or a halogen. Preferably Z has a molecular weight from about 300 to about 10,000.

The presently preferred aliphatic bismaleimides are those having the formula:

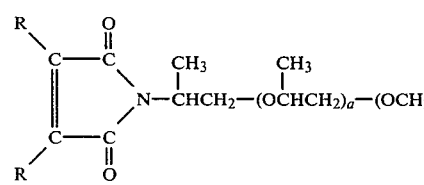

wherein the sum of a and c is about 3.5 and b is from about 13.5 to about 45.5 and R is as defined hereinabove. It is presently preferred that the sum of a and c be about 3.5 and b be about 20.5. Such bismaleimides may be formed by reacting one mole of a diamine precursor with two moles of maleic anhydride by the procedure described in U.S. Pat. No. 3,951,902 incorporated herein by reference. Other anhydrides may be used depending on the desired nature of R.

Suitable precursors are diamines manufactured and sold by Jefferson Chemical Co. under the designation "Jeffamine ED" and are available as products having average molecular weights of 600, i.e., when b equals about 13.5; 900, i.e., when b equals about 20.5; and 2000, i.e., when b equals about 45.5. Mixtures of such amines may be employed in preparing aliphatic bismaleimides and mixtures of formed bismaleimide may also be employed.

To form the polyimide prepolymer, aliphatic bismaleimides may be reacted with at least one aromatic polyamine and at least one aromatic bismaleimide by heating the components of the mix to a temperature sufficient to cause thermal reaction between the components. The thermal reaction is known as the Michael addition reaction. Reaction may occur under melt conditions with stirring. Temperatures ranging from about 100 to about 160° C., preferably about 120° to about 150° C. may be employed.

The aromatic polyamines presently contemplated for reaction with the aliphatic and aromatic bismaleimides to form the prepolymer are compounds of the general formula:

$$NH_2-R'-NH_2 \qquad (5)$$

wherein R' is defined hereinabove and/or an aromatic polyamine having the general formula:

(6)

where d has an average value ranging from about 0.1 to about 5.

The presently preferred aromatic polyamines are methylene dianiline and the amine of formula (6) where d is about 0.4 and the amine is a polyamine known as Jeffamine AP-22.

The aromatic bismaleimide which is used in forming the prepolymer has the general formula:

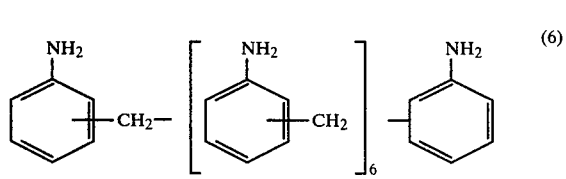
(4)

wherein R and R' are as defined hereinabove. The presently preferred aromatic bismaleimide is bis (4-maleimidophenyl) methane which has the formula:

(7)
CH—C(=O)—N—⟨⟩—CH₂—⟨⟩—N—C(=O)—CH
CH—C(=O)            C(=O)—CH

To achieve cure, a polyimide prepolymer or a mixture of such such prepolymers is combined with at least one aliphatic di- or multifunctional epoxy resin. The aliphatic epoxy resin presently contemplated to be employed has the general formula:

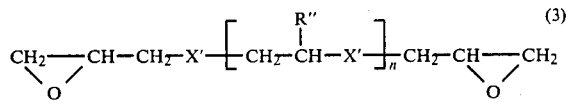
(3)

wherein X' is —O—, —S—, —CH₂—, or —CH₂CH₂—; wherein R" is —H or —CH₃; and wherein n is from 0 to about 20.

The presently preferred aliphatic epoxy resin is one where X is —O—, and n is from about 4 to about 8, and more preferably from about 6 to about 8.

The aliphatic structure of the crosslinking agent, i.e., the above described epoxy resin, imparts flexibility to the cured polyimide. If additional stiffness of the cured polyimide is required, then an aromatic or cycloaliphatic epoxy resin can be combined with the aliphatic epoxy resin as a crosslinking agent. The ratio of the aliphatic epoxy resin to either the aromatic or cycloaliphatic epoxy resins can be varied to impart more or less stiffness depending on the requirement of the finished product. Illustrative of the aromatic epoxy resins which may be added there may be mentioned epoxy resins known as D.E.N. 431 which are of the general formula:

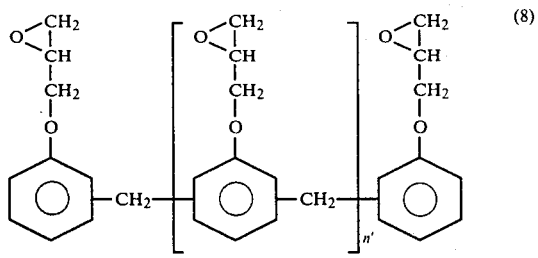
(8)

where n' is about 1, manufactured and sold by the Dow Chemical Company and; epoxy resin known as ERE 1359 having the general formula:

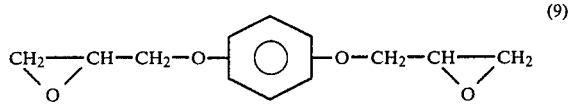
(9)

as manufactured and sold by the Ciba-Geigy Company and a suitable cycloaliphatic epoxy resin is an alicyclic diepoxy carboxylate of the formula:

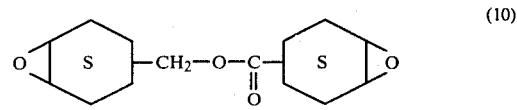
(10)

also manufactured by Ciba-Geigy Company.

The polyimide prepolymer is, as indicated, based on the reaction of an aliphatic bismaleimide, an aromatic polyamine and an aromatic bismaleimide. The aliphatic bismaleimide content will generally range from about 40 to about 80% by weight of the prepolymer; the aromatic polyamine content will generally range from about 10 to about 30% by weight of the prepolymer and the aromatic bismaleimide content will generally range from about 10 to about 30% by weight of the prepolymer.

Cure of the compositions of this invention is by reaction of the oxyrane ring with a primary or secondary hydrogen and may be schematically represented as follows:

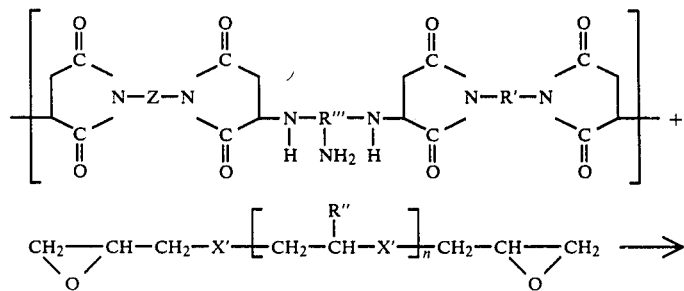

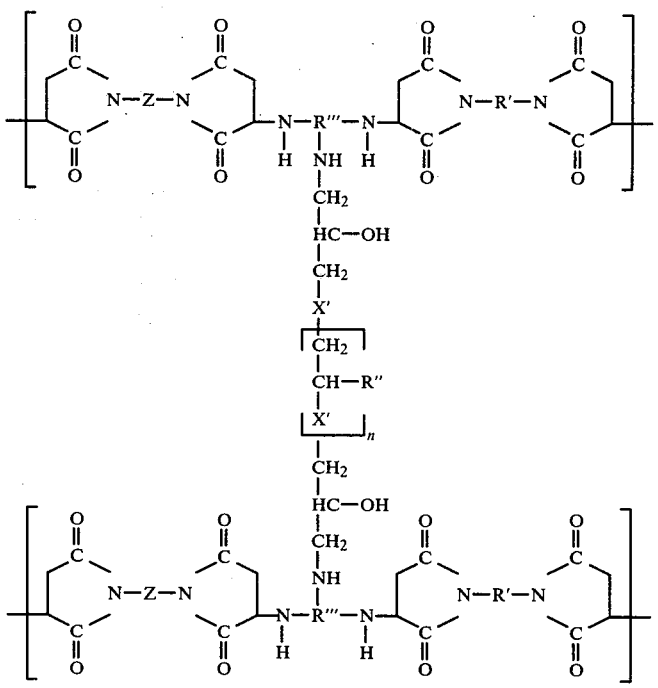

wherein Z, R', R", X' and n are as defined hereinabove and wherein R'" is the aromatic moiety of the aromatic diamine.

Curing of the prepolymer can be accomplished with or without the use of an accelerator. Suitable accelerators include hydrogenated aromatic polyamines, ethylene diamine, diethylene triamine, triethylene tetramine and the like. If present, accelerators are normally provided in an amount of up to about 10 percent by weight based on the weight of the polyimide and epoxy resin.

The compositions are normally formulated to contain from about 40 to about 95% by weight, preferably about 70 to about 90% by weight polyimide prepolymer based on the total weight of the polyimide prepolymer and epoxy resin present.

While nowise limiting, the following Examples are illustrative of this invention.

EXAMPLE I

Preparation procedure of the bis (maleimide) of 900 molecular weight Jeffamine (B)

To a solution of 1350 grams (1.50 moles) of Jeffamine ED-900 in 1.5 liters of dimethylacetamide in a 5 liter round bottom flask fitted with a mechanical stirrer, dropping funnel, heating mantel, and nitrogen inlet valve, was added a solution of 326.6 grams (3.3 moles) of maleic anhydride in 1.0 liter of dimethylacetamide. The flask was cooled with an external ice bath and the maleic anhydride solution was added dropwise through a dropping funnel at a rate such as to maintain the reaction mixture temperature below 55° C. (131° F.). After a 40 minute addition period, the reaction solution was allowed to stir for an additional 60 minutes. The reaction mixture was then heated to 150° C. (302° F.) and maintained at this temperature for 24 hours. The dimethylacetamide was removed in a rotovap under reduced pressure to give 1431.0 grams (90%) of a dark red viscous liquid. The desired structure was confirmed by infrared analysis.

EXAMPLE II

Preparation of bis (4 maleimideophenyl) methane (D)

To a stirred solution of 98 parts of weight of maleic anhydride in 700 parts of chloroform was added a solution of 99 parts of methylene dianiline in 600 parts of chloroform with cooling so that the temperature was maintained at 15°-20° C. The mixture was stirred for two hours, then the bright yellow precipitate of amide acid was collected by filtration, washed well with chloroform and air dryed. The dryed amide acid was mixed with 300 parts of acetic anhydride and 20 parts of anhydrous sodium acetate. The slurry was heated to 90° C., whereupon a clear yellow solution was obtained. The heat was removed, and an exothermic reaction occurred. The stirred mixture was allowed to cool to room temperature, and then added to 800 parts of cold ethanol. The precipitated bismaleimide was collected by filtration and washed with ethanol. Recrystallization of the crude product from aqueous dioxane yielded 94 grams of nearly colorless bismaleimide, melting point 155° to 158° C.

EXAMPLE III

Synthesis of linear polyimide formulation B/F/D

In a 500 milliliter resin kettle equipped with a Cole-Parmer constant speed torque control mechanical stirrer, temperature controlled oil bath, and a nitrogen inlet valve, was placed 84.8 grams (0.08 mole) of bismaleimides of Jeffamine 900 (B) and 28.6 grams (0.08 mole) of bis (4-maleimidophenyl) methane (D). The resin kettle was purged with nitrogen gas and heated moderately at 80° C. (176° F.) with a constant sheer rate of 300 rpm for 30 minutes before adding 27.8 grams (0.14 mole) of methylenedianiline (F). This mixture was stirred at 80° C. for 5 hours to give a viscous linear polymer. The viscosity was determined to be 6000 cps at 55° C. (131° F.).

EXAMPLE IV

Synthesis of linear polyimide formulation B/G/D

In a 500 milliliter resin kettle equipped with a Cole-Parmer constant speed torque control mechanical stirrer, temperature controlled oil bath, and a nitrogen inlet valve, was placed 84.8 grams (0.08 mole) of bismaleimides of Jeffamine 900 (B) and 28.6 grams (0.08 mole) of bis (4 maleimidophenyl) methane (D). The resin kettle was purged with nitrogen gas and heated moderately at 80° C. (176° F.) with a constant stir rate of 300 rpm for 30 minutes before adding 31.0 grams, 0.14 mole of Jeffamine AP-22 (G). This mixture was stirred at 80° C. for 5 hours to give a viscous linear polymer.

EXAMPLE V

Curing of flexible polyimide blend B/G/D with epoxy resin D.E.R. 732

Fourteen grams of polyimide prepared in accordance with Example IV, was added to 6.0 grams of an epoxy resin known as D.E.R. 732 and manufactured by Dow Chemical Company. With reference to page 11 hereinabove, D.E.R. 732 is an epoxy resin where X' is oxygen and n is about 4 and the chain length is about 19 carbon atoms. The mixture was warmed to 50° C. (122° F.) and then blended by manual stirring to give a homogeneous mass. Upon standing at ambient temperature for 48 hours, the resin system cured to a tack free state.

To another sample of this resin, the addition of 3% by weight of Jeffamine 398 accelerator manufactured and sold by Jefferson Chemical Co. induced the polyimide/epoxide to cure in 30 hours to a tack free state.

EXAMPLE VI

Curing of flexible polyimide blend B/G/D with epoxy resin D.E.R. 736

The same procedure is used as that discussed in Example V except that Dow epoxy resin D.E.R. 736 is substituted for D.E.R. 732. With reference to page 11, D.E.R. 736 is an epoxy resin where X' is oxygen, n is about 6.6, and the chain length is about 22 carbon atoms. The results were the same with the exception that the cured product was more flexible.

EXAMPLE VII

Four flexible polyimide/epoxy sealants produced in a similar manner to the flexible polyimide epoxy sealant of Example VI and a polysulfide sealant control were exposed in Jet Reference Fuel (JRF) for a period of 28 days (672 hours) at 140° F. The polysulfide 1422 control is a thiokol rubber base sealant manufactured and sold by Products Research Corporation. The specific sealants subjected to the tests and the results of the fuel exposure are presented in Table I. As can be seen from the fuel exposure data presented in Table I, each of the flexible polyimide/epoxy materials showed better fuel resistance in JRF versus the polysulfide control material during the exposure period. The four flexible polyimide/epoxy materials each demonstrated less fuel pick up and volume swell than the polysulfide 1422 control. Also, the polysulfide control material softened significantly (i.e., a 10 second Shore A drop from 59 to 42), whereas the four flexible polyimide/epoxy materials apparently underwent a final cure reaction in the fuel and leveled off in 10 second Shore A readings in the vicinity of 60. The polysulfide control specimens discolored from a chocolate brown color to light tan, whereas no color change was noted in the flexible polyimide/epoxy samples.

TABLE I

RESULTS OF JET REFERENCE FUEL EXPOSURE AT 140° F. FOR TWENTY-EIGHT DAYS

| Sealant Formulation[a] | Ten-Second Shore A Hardness after Exposure for Indicated Time Period | | | | Weight Pickup after Exposure | | | Volume Swell after Exposure (%) | | |
|---|---|---|---|---|---|---|---|---|---|---|
| | Initial | 1 Week | 3 Weeks | 4 Weeks | 1 Week | 3 Weeks | 4 Weeks | 1 Week | 3 Weeks | 4 Weeks |
| Polysulfide 1422 Control | 59 | 44 | 43 | 42 | 11.8 | 11.7 | 11.7 | 16.8 | 14.7 | 14.7 |
| B/F/D:736 (70/30)[b] | 41 | 47 | 58 | 61 | 5.9 | 6.2 | 6.3 | 9.4 | 7.8 | 8.8 |
| B/F/D:736 (60/40) | 57 | 62 | 61 | 64 | 7.8 | 8.8 | 9.4 | 10.2 | 11.3 | 12.2 |
| B/G/D:736 (70/30)[c] | 45 | 48 | 56 | 57 | 3.8 | 6.0 | 6.0 | 6.8 | 8.2 | 8.6 |
| B/G/D:736 (60/40) | 54 | 59 | 62 | 61 | 5.1 | 8.5 | 8.8 | 8.2 | 11.3 | 12.0 |

[a]The FPI/epoxy candidates were cured for 14 days at R.T. in the presence of 5% w/w triethylenetetramine.
[b]Parts by weight B/F/D to parts by weight D.E.R. 736
[c]Parts by weight B/G/D to parts by weight D.E.R. 736

All of the flexible polyimide/epoxy candidates remained very flexible after the JRF exposure.

EXAMPLE VIII

Tests were run to determine the thermal-oxidative screening of flexible polyimide/epoxy materials as compared to a polysulfide control. The polysulfide control was polysulfide 1422 and is as described hereinabove.

During this test, the temperature at which a given percentage of weight loss occurs is generally higher for the flexible polyimide/epoxy mateials than for the polysulfide control. The results of these tests are shown in Table II.

EXAMPLE IX

A screening test was conducted to assess the resistance of a representative flexible polyimide/epoxy sealant candidate to embrittlement at low temperatures. Samples were immersed in a dry ice/chloroform bath at a temperature of −67° F. The samples were allowed to equilibriate in the bath for 15 minutes, then were flexed up to a 90° bend in an immersed state. No evidence of severe embrittlement or cracking was observed, and the samples appeared to return to a highly flexible original state on warming to room temperature.

EXAMPLE X

A study of flexible polyimide/epoxy cure accelerators was conducted using the flexible polyimide/epoxy formulation 60 parts by weight B/G/D to 40 parts by weight D.E.R. 736 [B/G/D:736 (60/40)]. The flexible polyimide/epoxy blends were combined with 10% w/w of the accelerators based on the quantity of epoxy present.

TABLE II
SUMMARY OF THERMAL-OXIDATIVE SCREENING OF FLEXIBLE POLYIMIDE/EPOXY CANDIDATES AND POLYSULFIDE CONTROL[a]

| Sealant Sample | Test Environment | Temperature at Which Indicated Weight Loss Occurs (°C./°F.) | | | |
|---|---|---|---|---|---|
| | | 5% | 10% | 15% | 20% |
| Polysulfide 1422 | Nitrogen | 240/464 | 260/500 | 275/527 | 280/536 |
| Control | Air | 240/464 | 260/500 | 275/527 | 280/536 |
| B/F/D:736 (70/30) | Nitrogen | 240/464 | 285/545 | 300/572 | 305/581 |
| | Air | 225/437 | 280/536 | 300/572 | 310/590 |
| B/F/D:736 (60/40) | Nitrogen | 260/500 | 285/545 | 295/563 | 305/581 |
| | Air | 240/464 | 280/536 | 295/563 | 300/572 |
| B/G/D:736 (70/30) | Nitrogen | 250/473 | 285/545 | 300/572 | 310/590 |
| | Air | 235/455 | 280/536 | 300/572 | 310/590 |
| B/G/D:736 (60/40) | Nitrogen | 250/473 | 285/545 | 295/563 | 305/581 |
| | Air | 235/455 | 275/527 | 290/554 | 300/572 |

[a]Determinations were conducted employing a DuPont Model 990/951 Thermogravimetric Analyzer at a heat-up rate of 5° C./minute and a gas flow of 10cc/minute.

TABLE III
RESULTS OF ACCELERATOR SCREENING STUDY[a]

| Accelerator | Instantaneous Shore A Hardness at Room Temperature | |
|---|---|---|
| | 3 days | 6 Days |
| Hydrogenated AP-22 | 24 | 55–60 |
| Ethylene Diamine | 35 | 48–50 |
| Diethylene Triamine | 24 | 38–50 |
| Triethylene Tetramine | 20 | 38–42 |

[a]Performed on formulation B/G/D:736 (60/40)

The results of the accelerator screening study are summarized in Table III.

EXAMPLE XI

Peel tests (180°) were conducted on a formulation of 70 parts by weight of a prepolymer formed of 1 part by weight of the aliphatic bismaleimide B, 1 part by weight of a mixture of 6 parts by weight methylenedianiline and 4 parts by weight Jeffamine AP-22 and 1 part by weight of the aromatic bismaleimide D to 30 parts by weight D.E.R. 736 [B/6F:4G/D:736(70/30)]. The formulation was selected as representative of the formulations of flexible polyimides/epoxy sealants being tested. The peel specimens were prepared on U.S. Air Force supplied C-130 wing panels coated with aged polyurethane. The dimensions of the substrates were approximately 1.2 inch×6 inch×0.2 inch. The screen tabs employed were 30 mesh aluminum with a length of 1.0 inch and a width of 1.0 inch. The screen tabs were cleaned by immersing in cleaning solvent for a minimum of 10 minutes, rinsed with fresh solvent and then wiped dry with a lintfree cloth prior to use. The composition of the cleaning solvent is as follows: TT-N-95 Naptha 50% by volume; methyl ethyl ketone, 20% by volume; ethyl acetate, 20% by volume; and isopropyl alcohol, 10% by volume.

The C130 substrate panels were cleaned by wiping with a lint-free cloth saturated with the same solvent, then wiped with a dry cloth. The 180° peel strengths obtained on quintuplicate samples of the flexible polyimide/epoxy sealant candidates are given in Table IV. The mode of failure for each sample was primarily cohesive, and above 20 pounds per square inch.

TABLE IV
INITIAL 180° PEEL RESULTS

| Panel Number | Peel Strength (pounds/inch) | |
|---|---|---|
| | High | Low |
| 1 | 38 | 33 |
| 2 | 50 | 32 |
| 3 | 47 | 32 |
| 4 | 46 | 33 |
| 5 | 48 | 30 |
| Average | 46 | 32 |

What is claimed is:

1. A low temperature curable composition comprising:
   (a) at least one curable polyimide prepolymer formed at a temperature sufficient to cause thermal reaction between heated components of a mixture of:
      (i) at least one aliphatic bismaleimide of the formula:

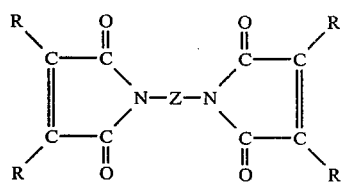

wherein Z is a polyaliphatic ether in which each aliphatic group individually contains from one to about six carbon atoms, and in which each R is independently selected from the group consisting of hydrogen, an aliphatic group containing one or two carbon atoms, a benzenoid radical and a halogen;

(ii) at least one aromatic polyamine; and
      (iii) at least one aromatic bismaleimide of the formula:

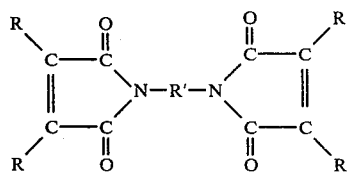

wherein each R is independently selected from the group consisting of hydrogen, an aliphatic group containing one or two carbon atoms, a benzenoid radical and a halogen and wherein R' is a bifunctional benzenoid radical selected from the group consisting of:

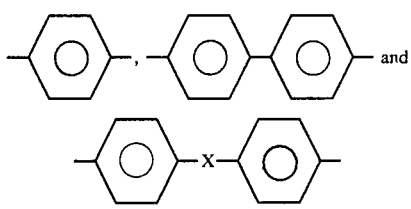

wherein X is selected from the group consisting of: —O—, —S—, —SO$_2$—, —CH$_2$—, —C$_2$H$_4$—, —CO—, —C$_3$H$_6$—, and

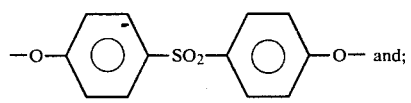

(b) at least one epoxy resin of the formula:

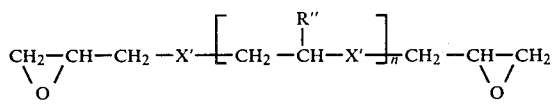

wherein X' is selected from the group consisting of: —O—, —S—, —CH$_2$— and —CH$_2$CH$_2$—; R" is selected from the group consisting of: —H, and —CH$_3$; and n is from 0 to about 20.

2. A composition as claimed in claim 1 in which the aliphatic bismaleimide is of the formula:

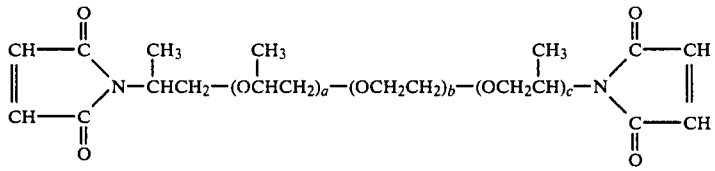

where the sum of a and c is equal to about 3.5 and b is equal to about 13.5 to about 45.5.

3. A composition as claimed in claim 1 in which the aliphatic bismaleimide is of the formula:

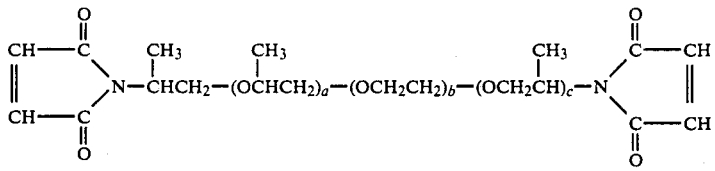

where the sum of a and c is equal to about 3.5 and b is equal to about 20.5.

4. A composition as claimed in claim 1 in which the aromatic polyamine is selected from the group consisting of amines of the formula:

NH$_2$—R'—NH$_2$ wherein R' is a bifunctional benzenoid radical selected from the group consisting of:

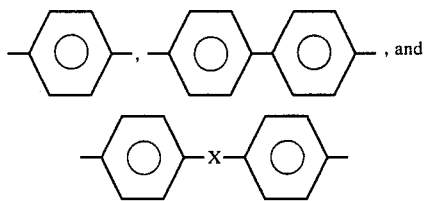

where X is selected from the group consisting of: —O—, —S—, —SO$_2$—, —CH$_2$—, —C$_2$H$_4$—, —CO—, —C$_3$H$_6$—, and

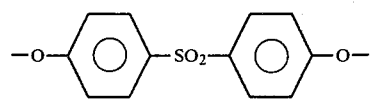

and

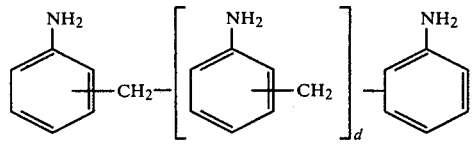

wherein d has a value from 0 to about 5, and mixtures thereof.

5. A composition as claimed in claim 1 in which the aromatic polyamine is selected from the group consisting of methylenedianiline, an amine of the formula:

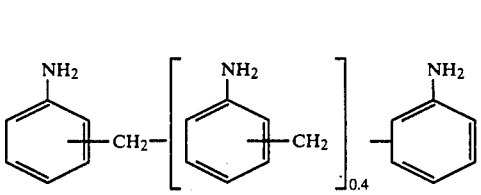

and mixtures thereof.

6. A composition as claimed in claim 1 in which the aromatic bismaleimide has the formula:

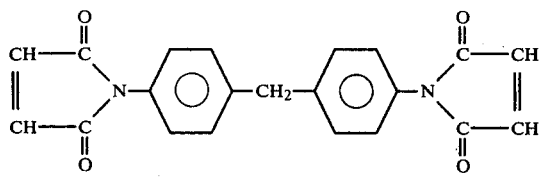

7. A composition as claimed in claim 1 in which X' is oxygen, and in which n is from about 4.0 to about 8.0.

8. A composition as claimed in claim 1 in which X' is oxygen, and in which n is from about 6.0 to about 8.0.

9. A low temperature curable composition comprising:
(a) at least one curable polyimide prepolymer formed at a temperature sufficient to cause thermal reaction between heated components of a mixture of:
(i) at least one aliphatic bismaleimide of the formula:

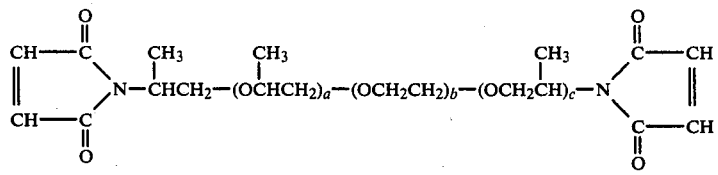

where the sum of a and c is equal to about 3.5 and b is equal to about 13.5 to about 45.5; and
(ii) an aromatic polyamine selected from the group consisting of methylene dianiline, an amine of the formula:

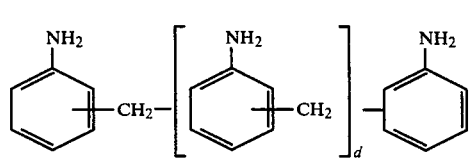

wherein d has a value of from 0 to about 5 and mixtures thereof;
(iii) an aromatic bismaleimide of the formula:

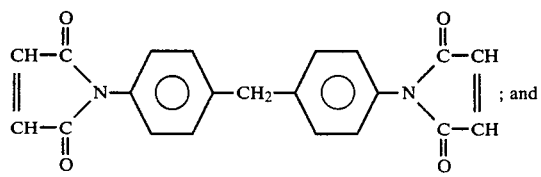
; and (b) at least one epoxy resin of the formula:

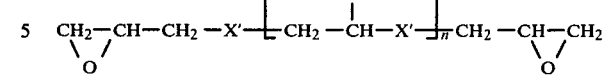

wherein X' is —O—, —S—, —CH$_2$—, —CH$_2$CH$_2$—; and wherein R" is selcted from the group consisting of: —H and —CH$_3$ and wherein n is from about 0 to about 20.

10. A composition as claimed in claim 9 where the aliphatic bismaleimide has the general formula:

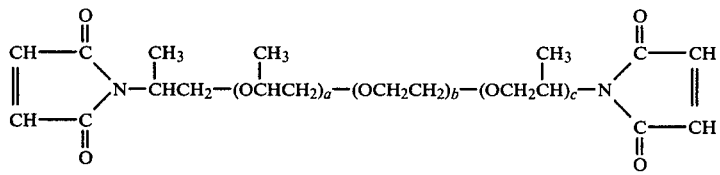

and the sum of a and c is equal to about 3.5 and b is equal to about 20.5.

11. A composition as claimed in claim 9 in which the aromatic polyamine is an amine of the formula:

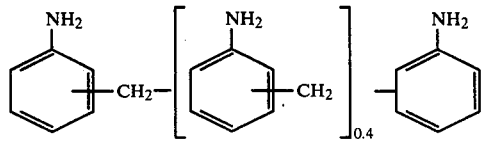

12. A composition as claimed in claim 9 in which X' is oxygen and n is from about 4 to about 8.

13. A composition as claimed in claim 10 in which X' is oxygen and n is from about 4 to about 8.

14. A composition as claimed in claim 11 in which X' is oxygen and n is from about 4 to about 8.

15. A composition as claimed in claim 9 in which X' is oxygen, and in which n is from about 6 to about 8.

16. A composition as claimed in claim 10 in which X' is oxygen, and in which n is from about 6 to about 8.

17. A composition as claimed in claim 11 in which X' is oxygen, and in which n is from about 6 to about 8.

18. A low temperature curable composition comprising:
(a) at least one curable polyimide prepolymer formed at a temperature sufficient to cause thermal reaction between heated components of a mixture of:
(i) at least one aliphatic bismaleimide of the formula:

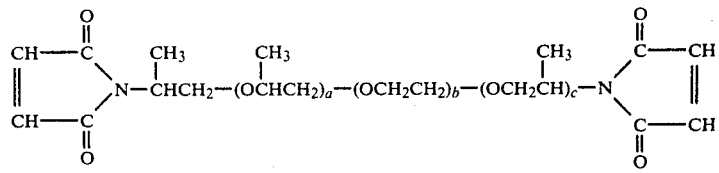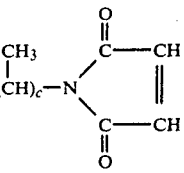

where the sum of a and c is equal to about 3.5 and b is equal to about 20.5;

(ii) methylene dianaline;

(iii) an aromatic bismaleimide of the formula:

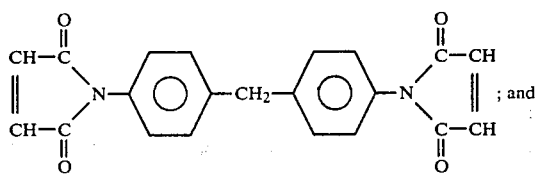

(b) at least one epoxy resin of the formula:

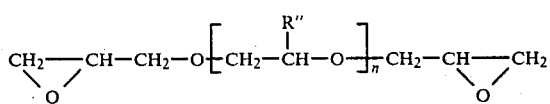

wherein R" is selected from the group consisting of —H, and $CH_3$ and in which n is from about 4.0 to about 8.0.

19. A composition as claimed in claim 18 in which n is from about 6.0 to about 8.0.

20. A low temperature curable composition comprising:

(a) at least one curable polyimide prepolymer formed at a temperature sufficient to cause thermal reaction between heated components of a mixture of:

(i) at least one aliphatic bismaleimide of the formula:

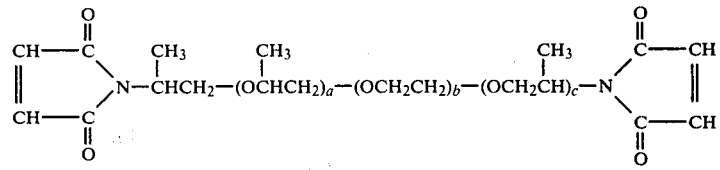

where the sum of a and c is equal to about 3.5 and b is equal to about 20.5; and (ii) an aromatic polyamine of the formula:

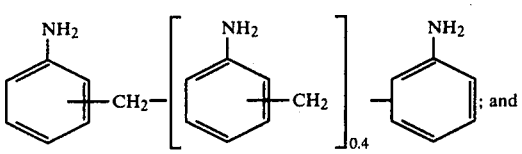

(iii) an aromatic bismaleimide of the formula:

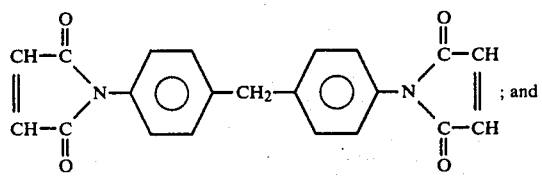

(b) at least one epoxy resin of the formula:

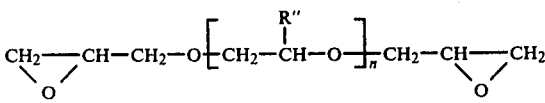

wherein R" is selected from the group consisting of: —H, and —$CH_3$; and wherein n is from about 4 to about 8.

21. A composition as claimed in claim 20 in which n is from about 6.0 to about 8.0.

* * * * *